United States Patent
Wang He

(10) Patent No.: US 8,956,037 B2
(45) Date of Patent: Feb. 17, 2015

(54) LIGHT GUIDE PLATE AND BACKLIGHT MODULE INCLUDING SAME

(75) Inventor: Li-Ying Wang He, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 373 days.

(21) Appl. No.: 13/444,873

(22) Filed: Apr. 12, 2012

(65) Prior Publication Data

US 2013/0100701 A1    Apr. 25, 2013

(30) Foreign Application Priority Data

Oct. 21, 2011    (TW) .............................. 100138176 A

(51) Int. Cl.
*F21V 7/00*    (2006.01)
*F21V 8/00*    (2006.01)

(52) U.S. Cl.
CPC .................................... *G02B 6/0038* (2013.01)
USPC ........................ 362/616; 362/97.1; 362/97.4

(58) Field of Classification Search
USPC ....................... 362/97.1–97.4, 616
See application file for complete search history.

(56) References Cited

U.S. PATENT DOCUMENTS

| | | | | |
|---|---|---|---|---|
| 7,658,502 B2* | 2/2010 | Moon et al. | ................... | 362/97.2 |
| 8,328,407 B2* | 12/2012 | Kim et al. | ...................... | 362/625 |
| 8,408,775 B1* | 4/2013 | Coleman | ........................ | 362/615 |
| 8,632,201 B2* | 1/2014 | Gilbert et al. | ................. | 362/97.1 |
| 8,657,479 B2* | 2/2014 | Morgan et al. | ................. | 362/620 |
| 2007/0047221 A1* | 3/2007 | Park | ................................. | 362/97 |
| 2007/0183137 A1* | 8/2007 | Iwasaki | ........................... | 362/97 |

* cited by examiner

*Primary Examiner* — Anabel Ton
(74) *Attorney, Agent, or Firm* — Novak Druce Connolly Bove + Quigg LLP

(57) ABSTRACT

A light guide plate includes a light incident surface and a plurality of micro cylinders protruding from the light incident surface in parallel. Each of the micro cylinders has a circumference surface and two opposite end surfaces. The circumference surface is connected to the light incident surface. The two end surfaces are positioned on two opposite ends of the circumference surface, and are perpendicular to the light incident surface. Each of the two end surfaces is circular arc-shaped, and the radius of each of the two end surfaces is in the range of 0.04 μm to 0.07 μm.

6 Claims, 3 Drawing Sheets

LIGHT GUIDE PLATE AND BACKLIGHT MODULE INCLUDING SAME

BACKGROUND

1. Technical Field

The present disclosure relates to light source devices and, particularly, to a light guide plate and a backlight module using the light guide plate.

2. Description of Related Art

Light guide plates are often used to expand a number of point light sources to an area light source. When a light incident surface of the light guide plate does not distribute micro structures, the maximum luminance of a light emitting surface of the light guide plate can reach 6980 lux, but a number of hot spots may appear on the light emitting surface, that is, the light rays from the light emitting surface are not distributed uniformly. Currently, a number of micro structures are applied to the light incident surface allowing the light emitting surface to have increased light uniformity. However, the brightness of the area light sources decreases due to light diffused by the micro structures, and the maximum luminance of the light emitting surfaces only reach 6400 lux.

Therefore, it is desirable to provide a light guide plate and a backlight module using the light guide plate that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
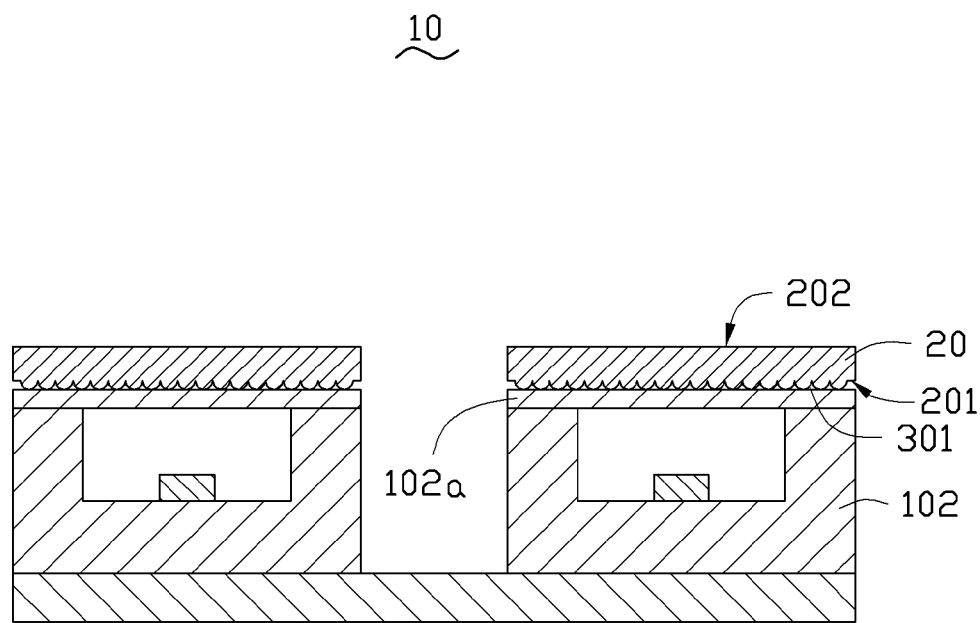
FIG. 1 is a sectional view of a backlight module according to an exemplary embodiment, the backlight module including light guide plates.

FIG. 1 shows a backlight module 10, according to an embodiment, including two light sources 102 and two light guide plates 20 aligned with the two light sources 102 respectively. Each of the two light sources 102 has a light emitting portion 102a. The number of the light source 102 is not limited to this embodiment. In this embodiment, the light source 102 is a light emitting diode (LED).

Figure 2:
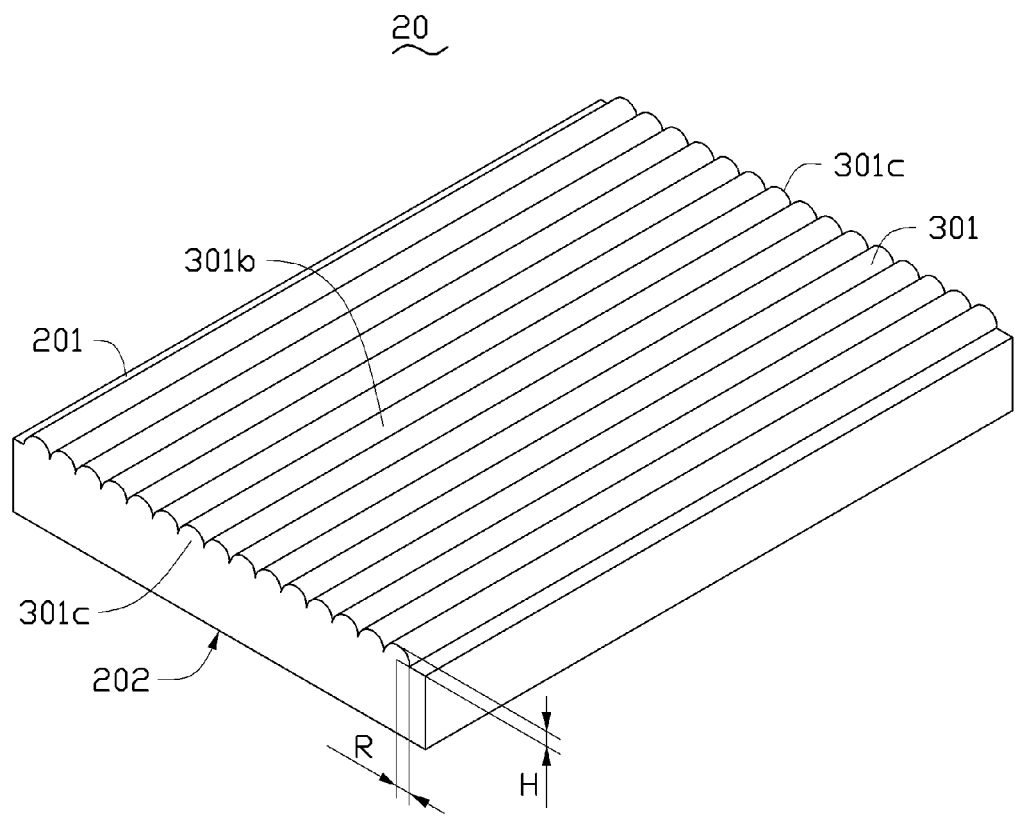
FIG. 2 is an isometric view of one of the light guide plates of FIG. 1.

FIG. 2 shows the light guide plate 20 which is made of a transparent material, and includes a light incident surface 201 facing the light emitting portion 102a of the corresponding light source 102 and a light emitting surface 202. The light emitting surface 202 and the light incident surface 201 are at opposite sides of the light guide plate 20. The light emitting surface 202 is substantially parallel to the light incident surface 201. In other embodiments, the light emitting surface 202 also can be substantially perpendicular to the light incident surface 201.

A number of semi column-shaped micro cylinders 301 protrude from the light incident surface 201 in parallel. The shapes of the micro cylinders 301 are the same as each other. The central axes of the micro cylinders 301 are parallel to the light incident surface 201. The area of the light incident surface 201 is substantially equal to the area of the light emitting portion 102a. Each micro cylinder 301 has a circumference surface 301b and two opposite end surfaces 301c. The circumference surface 301b connects to the light incident surface 201. The two end surfaces 301c are positioned on two opposite ends of the circumference surface 301b, and are perpendicular to the light incident surface 201.

In this embodiment, the micro cylinders 301 are distributed continuously. In other embodiments, a gap can be formed between two adjacent micro cylinders 301.

A maximum height of each micro cylinder 301 along a direction perpendicular to the light incident surface 201 is H. Each of the two end surfaces 301c is circular arc-shaped, and a radius of each end surface 301c is R.

In this embodiment, the mode of the LED is NSSW206T-E. When H is substantially equal to about 0.05 micro meters (μm), R is changed in the range of 0.02 μm to 0.1 μm, the change of the luminance of the light emitting surface 202 of the light guide plate 20 is shown in FIG. 3 and table 1.

TABLE 1

| R(μm) | Luminance(lux) | luminous flux(lm) |
|---|---|---|
| 0.02 | 6775.98 | 24.94 |
| 0.03 | 6845.69 | 25.25 |
| 0.04 | 6878.83 | 25.37 |
| 0.05 | 6880.20 | 25.37 |
| 0.06 | 6890.27 | 25.41 |
| 0.07 | 6902.86 | 25.46 |
| 0.08 | 6894.04 | 25.43 |
| 0.09 | 6905.00 | 25.47 |
| 0.1 | 6905.47 | 25.47 |

Figure 3:
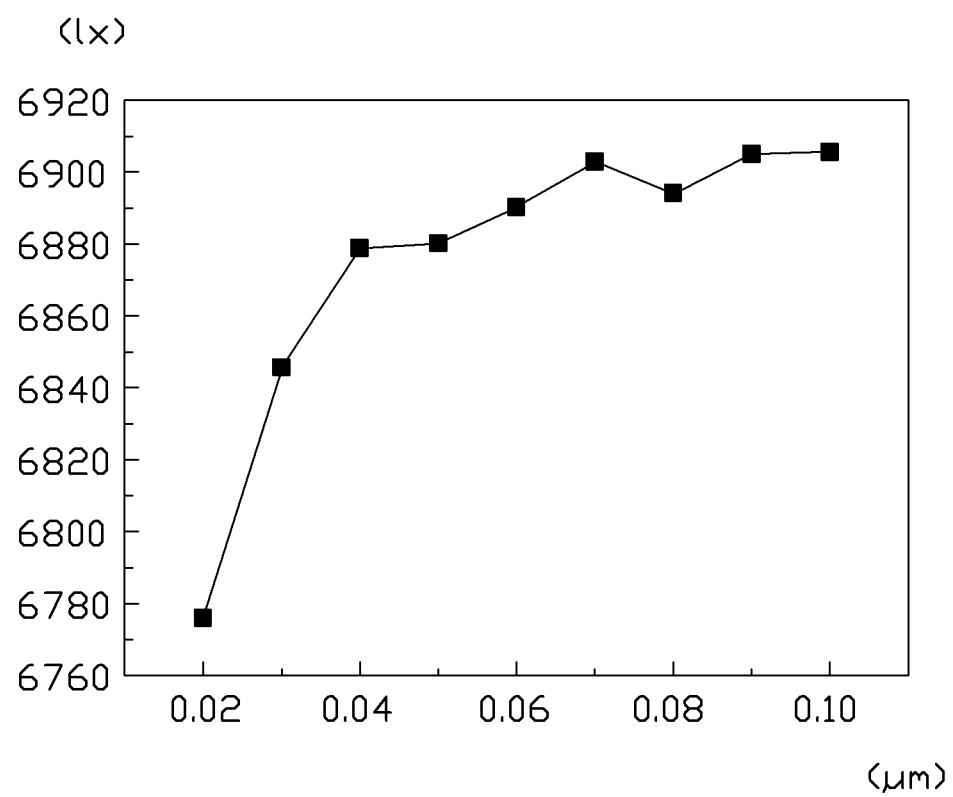
FIG. 3 is a chart showing the relationships between the luminosity distribution of the backlight module of FIG. 1 and dimensions of micro structure formed on the light guide plate.

FIG. 3 and Table 1 show that (i) the luminance of the light guide plate 20 is gradually increased when R is changed from 0.02 μm to 0.07 μm; (ii)the luminance of the light guide plate 20 of which R is in the range of 0.04 μm to 0.07 μm only reduces 80 lux~100 lux with respect to the maximum luminance (i.e. 6980 lux) of the light emitting surface of the light guide plate without micro structures in the related art. But increases 470 lux~500 lux with respect to the maximum luminance (i.e. 6400 lux) of the light emitting surface of the light guide plate with microstructures in the related art.

A number of tests are manifested in which, the number of the hot spots of the light guide plate 20 of which R is in the range of 0.04 μm to 0.07 μm is less than that of the light guide plate 20 of which R is larger than 0.07 μm.

To prevent the light from the light source 102 being dispersed into the air, the light emitting portion 102a of the light source 102 contacts the light incident surface 201 of the light guide plate 10.

Because the emitting surface 202 of the light guide plate 20 has micro cylinders 301, and R is in the range of 0.04 μm to 0.07 μm, the light guide plate 20 can balance the luminance and the hot spots. That is, the luminance of the emitting surface 202 of the light guide plate 20 is greater than that of the light guide plate with microstructures in the related art. While the light rays from the light emitting surface 202 of the light guide plate 20 are distributed more uniformly than that of the light guide plate without microstructures in the related art.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A backlight module comprising:
   a plurality of light sources, each of the light sources having a light emitting portion; and
   a plurality of light guide plates, each light guide plate aligned with a respective one of the light emitting portions;
   wherein each light guide plate comprises a light incident surface and a plurality of micro cylinders protruding from the light incident surface and arranged in parallel to each other, each of the micro cylinders has a circumference surface and two opposite end surfaces, the circumference surface is connected to the light incident surface, the two end surfaces are positioned on two opposite ends of the circumference surface, and are perpendicular to the light incident surface, each of the two end surfaces is circular arc-shaped, the radius of each of the two end surfaces is in the range of 0.04 μm to 0.07 μm.

2. The backlight module of claim 1, wherein the area of each light emitting portion is substantially equal to the area of the corresponding light incident surface.

3. The backlight module of claim 1, wherein a maximum height of each micro cylinder along a direction perpendicular to the light incident surface is in the range of 0.015 μm to 0.06 μm.

4. The backlight module of claim 1, wherein the light guide plate comprises a light emitting surface, the light emitting surface is connected to the light incident surface.

5. The backlight module of claim 1, wherein the light guide plate comprises a light emitting surface, the light emitting surface is parallel to the light incident surface.

6. The backlight module of claim 1, wherein a gap is defined between each two adjacent micro cylinders.

* * * * *